Figure 1:
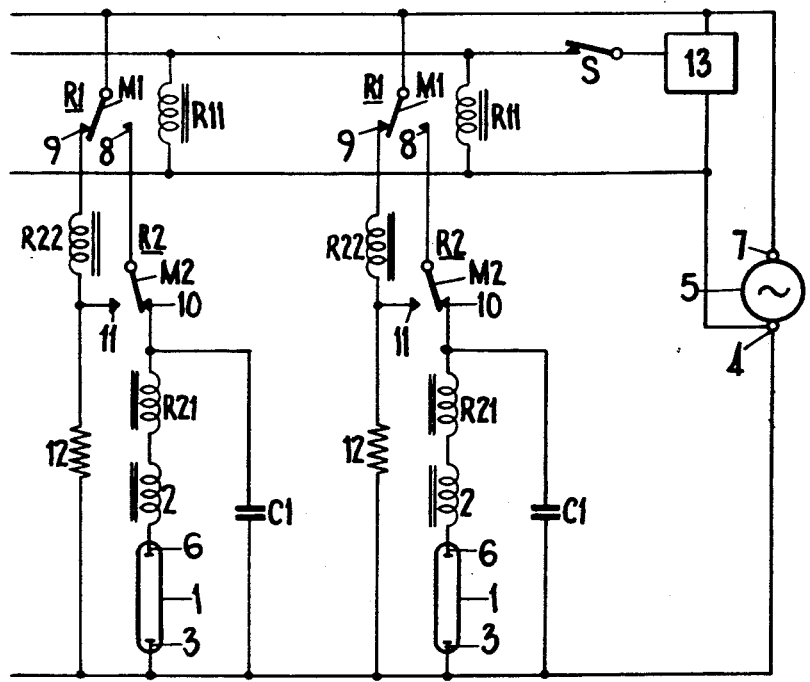

April 19, 1960

N. H. TYRWHITT ET AL 2,933,650

ELECTRIC CIRCUIT ARRANGEMENTS FOR OPERATING
ONE OR MORE ELECTRIC LAMPS

Filed Nov. 27, 1957

2 Sheets-Sheet 1

INVENTORS
NORMAN HUGH TYRWHITT
CHARLES EDINGTON WILLIAMS
BY Kirschstein, Kirschstein & Ottinger
ATTORNEYS

2,933,650
ELECTRIC CIRCUIT ARRANGEMENTS FOR OPERATING ONE OR MORE ELECTRIC LAMPS

Norman Hugh Tyrwhitt, Watford, and Charles Edington Williams, Stanmore, England, assignors to The General Electric Company Limited, London, England Application November 27, 1957, Serial No. 699,403

Claims priority, application Great Britain November 27, 1956

8 Claims. (Cl. 315—232)

This invention relates to electric circuit arrangements designed for operating one or more electric discharge lamps from an alternating current supply and which are of the kind having at least one load circuit arranged to include one or more of said lamps and, when the lamp or lamps are connected therein, is of inductive impedance at the supply frequency and is shunted by a capacitor for improving the overall power factor in use of the arrangement.

The invention relates more particularly, though not exclusively, to circuit arrangements of the above kind having switching means for switching the lamps on and off in rapid succession, and is mainly concerned with such circuit arrangements in which each load circuit is designed to include one or a number of series-connected electric discharge lamps together with an inductive ballast impedance.

Lamp circuits of this kind are often used, for example, in aerodrome identification beacon arrangements, several lamp load circuits, for example four, being arranged to be switched on and off in unison in repeated Morse code sequences. Usually in such circuit arrangements the lamp load circuits are connected in parallel with each other and each is shunted by a corresponding power factor correction capacitor. In addition arrangements of this kind usually employ an alternative load, usually resistive which is substituted for the lamp load circuits when the lamps are switched off, the impedance of the substitution load being approximately the same as the impedance of the lamp load circuits at the supply frequency so that the input current of the circuit arrangement is substantially the same whether the lamps are switched on or off.

This is desirable since in many cases aerodrome identification beacon arrangements of the kind referred to are supplied with current by means of small individual motor-driven alternators, and an appreciable variation in the load in such an arrangement might give rise to corresponding changes in the output voltage of the alternator and to excessive wear of parts of the motor and alternator.

Known arrangements of the kind specified suffer from the disadvantage that should a lamp be subject to an open-circuit failure, the current taken by the arrangement increases considerably due to the presence of the power factor correction capacitor shunting the corresponding lamp load circuit, and where the current for the arrangement is generated by an individual alternator, the excess current might give rise to excessive wear as aforesaid, and also, in the case where the arrangement includes a plurality of discharge lamp load circuits, the voltage regulation of the alternator might be upset to such an extent that one or more of the lamps in other lamp load circuits are prevented from starting.

The main object of the present invention is to provide a circuit arrangement of the kind specified suitable for use in aerodrome identification beacon arrangements in which the above disadvantages are reduced. However, the invention is not restricted to use in aerodrome identification beacons but may be used to advantage in other lamp circuit arrangements of the kind specified.

According to the invention in an electric lamp-operating circuit arrangement of the kind specified each lamp load circuit includes an electromagnetic relay having contacts connected in series with the power factor correction capacitor shunting that load circuit with respect to the connection of the capacitor between the supply terminals, which contacts are normally open in the unenergised condition of the relay, the relay having an operating coil connected so as to be in series with the lamp or lamps when the latter is/are connected in the load circuit so that, in use of the arrangement, the relay is energised to close said contacts when the circuit between the supply terminals is completed through the lamp or lamps of the load circuit but so that when the circuit through the lamp or lamps is broken and the relay is de-energised the relay contacts are opened to break the circuit through the power factor correction capacitor.

In this way an excessive rise in the amount of input current due to flow of current through the power factor correction capacitor is prevented when an open-circuit failure of a lamp load circuit occurs.

In an arrangement in accordance with the invention designed for use in aerodrome identification beacon systems and other arrangements, in which the lamps are arranged to be switched on and off in rapid succession, means are preferably provided for maintaining the relay contacts in the closed condition during the periods when the corresponding lamp load is switched off during normal operation.

This can readily be achieved in arrangements of the kind wherein there is provided, for each lamp load circuit, a substitution load arranged to be switched into circuit by said switching means during the "off" periods of the lamp load, by including a further operating coil of said relay in series with the substitution load, and by arranging that the inertia of the relay armature is sufficiently great to ensure that the relay contacts remain closed whilst the switching means is operated to replace the lamp load by the substitution load and vice versa.

In some cases in a circuit arrangement of this latter kind for operating discharge lamps the relay may be arranged to connect the associated substitution load in series with the supply when the relay contacts in series with the corresponding power factor correction capacitor are opened, so that any appreciable reduction in the load when a lamp fails to strike is also avoided.

In some cases the said relay contacts, after being opened in response to the lamp's failure to strike on connection of the lamp load circuit to the supply by the switching means, may close when the said switching means is subsequently operated to disconnect the lamp, and opened again should the lamp fail to strike on the subsequent connection of the lamp to the supply.

However cut-out means are preferably included for preventing continued operation of the relay contacts should a lamp fail to start after several successive operations of the switching means, and for maintaining the contacts in the open position with the power factor correction capacitor fully out of circuit.

This may conveniently be achieved by including in series with each other with respect to the supply a thermistor and additional contacts of the said electromagnetic relay, which contacts are arranged to be open when the relay is energized, together with current responsive means for interrupting the circuits through the thermistor and through the relay operating coil with respect to the supply terminals should the current through the thermistor reach a predetermined value, it being arranged that this value is attained only after successive operations of the relay.

The current responsive means may for example consist of a fuse.

For example where the switching means for alternately switching into circuit the lamp load and the substitution load consists of a further electromagnetic relay, the latter relay may be so arranged that when it is in the unenergised condition the lamp load is connected to the supply, and the fuse can be connected in series with the operating coil of said further relay, as well as in series with the thermistor, so that the operation of the fuse breaks both the thermistor circuit and the circuit through the operating coil of said further relay.

Since the lamp load circuit is broken at the lamp, no current then flows through the operating coil of the relay having its contacts in series with the power factor correction capacitor, so that this relay is also held in the unenergised condition with its contacts open and breaking the circuit through power factor correction capacitor.

The lamp and the substitution load circuit may in some cases share a common operating coil of the relay having its contacts in series with the power factor correction capacitor, although a relay with two operating coils may in some instances be more advantageous.

In order to explain the invention more fully two circuit arrangements in accordance with the invention suitable for use in an aerodrome identification beacon will now be described by way of example with reference to Figures 1 to 4 of the accompanying schematic drawings, in which—

Figure 2:
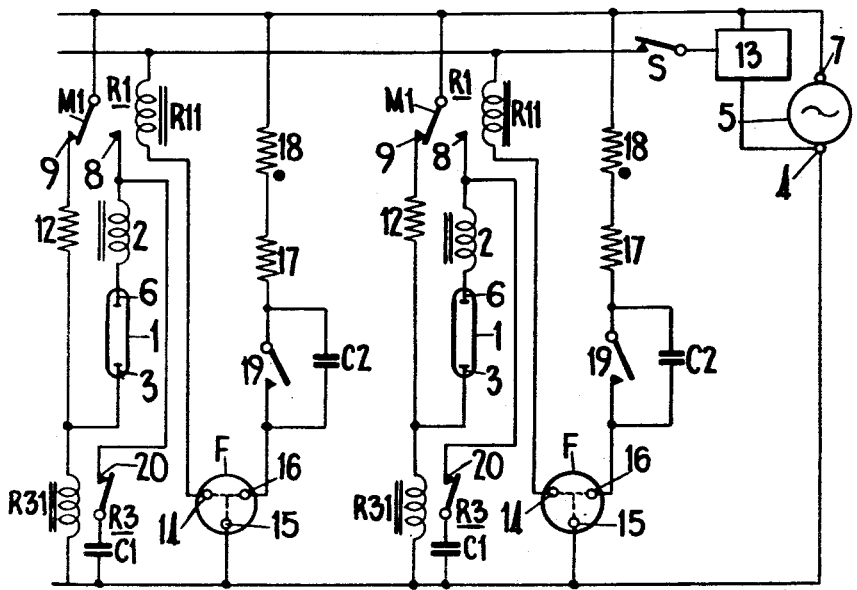
Figure 3:
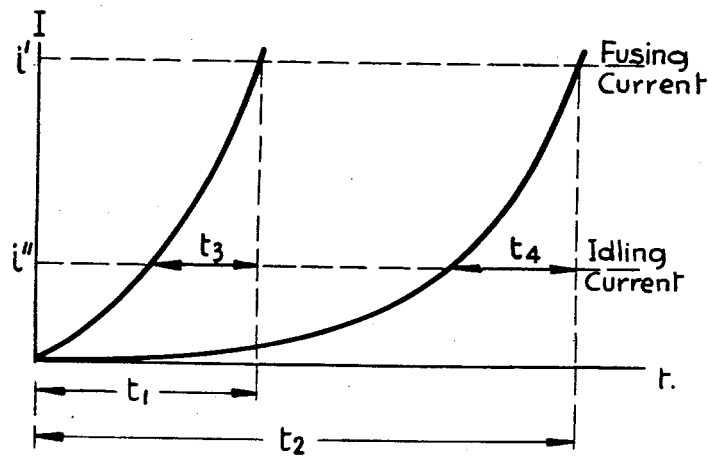
Figure 4:
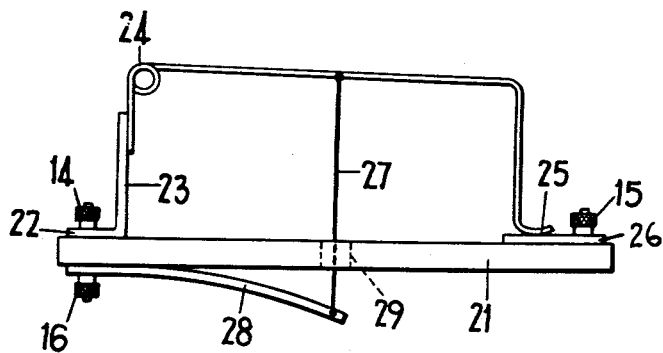

Figure 1 represents a simple circuit arrangement of the kind wherein the respective power factor correction capacitor is repeatedly switched out of circuit with each failure of a lamp to strike, Figure 2 represents a circuit arrangement in which means are provided for permanently breaking the circuit through the power factor correction capacitor after several sucessive failures of the lamp to strike, and including a thermistor as previously described, Figure 3 shows the operating characteristics of a typical thermistor under different ambient temperatures, and Figure 4 represents one form of fuse suitable for use in the circuit illustrated in Figure 2.

Referring to Figure 1 of the drawings the arrangement comprises four similar branches each comprising a lamp load circuit and associated substitution load circuit two of which branches have been omitted for simplicity. Each lamp load circuit includes a neon-filled electric discharge lamp 1 in series with a choke 2 which provides an inductive ballast impedance for the lamp in operation of the circuit. The lamps may either be of the hot-cathode or the cold-cathode kind, and in the former case means (not shown) should of course be provided for supplying heating current to the lamp electrodes in use of the arrangement. In each lamp load circuit one lamp electrode 3 is connected to a supply terminal 4 of an electric alternator 5, the other lamp electrode 6 being connected to the second supply terminal of the alternator through the choke 2 and the contacts of two electromagnetic relays R1 and R2.

Thus the supply terminal 7 is connected to the movable contact M1 of the first relay R1, the fixed contact 8 with which the movable contact engages during the normal unenergised condition of the relay being connected to the movable contact M2 of the second relay R2. The second relay R2 has two operating coils R21 and R22, the first of these being connected between the fixed contact 10 of the second relay R2 and the choke 2 so as to be in series with the lamp with respect to the supply, the current through the coil R21 when the lamp is operating holding the relay armature in so that the movable contact M2 of the relay R2 is held in engagement with the fixed contact 10.

The other fixed contact 9 of the first relay R1 is connected to the supply terminal 4 of the alternator 5 through the second operating coil R22 of the second relay R2 and a resistance 12 which provides the substitution load, the junction of the coil R22 and the resistor 12 being connected to the second fixed contact 11 of the second relay R2 with which the movable contact M2 engages in the unenergised condition of the relay.

The operating coil R11 of the first relay R1 is connected at one end to the supply terminal 4 of the alternator 5 and at the other end through a switch S to the other supply terminal 7 of the alternator. The switch S is operated intermittently by means of the control circuit 13 for intermittently energising the operating coil R11 of the relay R1 so as to cause the lamps of the arrangement to flash on and off in use of the circuit in a predetermined Morse code sequence. The control circuit 13 and switch S are common to the relays R1 of the four lamp circuits, the operating coils R11 of these relays being in parallel with each other and all in series with the switch S. The construction of the control circuit 13 itself is not relevant to the present invention and may be of any suitable known kind.

On first switching on the arrangement the closure of the switch S energises each relay R1 and causes the movable contact M1 thereof to engage the fixed contact 9, current then flowing through the relay operating coil R22 in the respective substitution load circuit. This results in the energisation of the relay R2 and the movable contact M2 of this relay engages the fixed contact 10, but the corresponding lamp 1 is not energised since current through the lamp load circuit is broken at the relay R1.

When the switch S is opened the corresponding de-energisation of each relay R1 causes the movable contact M1 to engage the fixed contact 8, so completing the lamp load circuit and causing the lamp 1 to light, the relay R2 being held in the energised condition with the contact M2 in engagement with the fixed contact 10 by current through the relay operating coil R21.

Subsequent closure of the switch S results in the movable contact M1 of the first relay R1 re-engaging with the fixed contact 9, the lamp 1 being extinguished and the substitution load circuit being completed, the current through the operating coil R22 keeping the relay R2 energised during the periods when the lamp is switched off.

The armature of the relay R2 is arranged to have a large moment of inertia so that the movable contact M2 is held in engagement with the fixed contact 10 during the short interval in which the movable contact M1 of the relay R1 is changing over from the contact 9 to contact 8 or from contact 8 to contact 9, as the lamp is switched from the "on" to the "off" condition and vice versa.

A capacitor C1 is shunted across the lamp the choke 2 and the series-connected operating coil R21 of the relay R2 for correcting the power factor when the lamp is operating, the capacity of the capacitor being such that the input current is reduced to about a third of that which would flow in the absence of the capacitor. The resistance 12 is such that during the "off" periods of the lamp, in normal operation of the circuit, the value of input current is substantially the same as it is when the lamp is operating.

In this way a substantially constant load is presented to the alternator during normal operation of the arrangement.

In the event of a lamp failing to start when the movable contact M1 of the first relay engages the fixed contact 8, no current will flow through the operating coil R21 of the second relay R2 and the relay will be de-energized. The time for which the movable contact M1 remains in engagement with the fixed contact 8 is large compared with the time taken for M1 to change from 9 to 8 and vice versa, so that the inertia of the armature is overcome and contact M2 returns to engagement with the fixed contact 11, a circuit being completed through the substitution load 12 instead of through the power factor correction capacitor C1.

In this way the input current is maintained at substantially the same value as it would have if the lamp had started, apart from an initial surge as the armature contact M1 first engages the fixed contact 8 before the second relay returns to the de-energised position, and a more even load is presented to the alternator than would otherwise be the case.

When the relay R1 is energised again to switch the lamps off, the movable contact M1 engages the fixed contact 9, the second relay R2 is again energised by current through the relay operating coil R22, and the movable contact M2 of the second relay re-engages with the fixed contact 10, but the circuit to the lamp and to the power factor correction capacitor C1 is broken at the first relay R1 and the path of the current is through the substitution load in the normal manner for the "off" condition of the lamps. Should the lamp fail to start on the subsequent de-energisation of the relay R1 the second relay R2 will again be de-energised thus breaking the circuit through the power factor capacitor C1 as before, this being repeated at each failure of the lamp to start.

In some cases it may be undesirable for the second relay R2 to be continually operated when the lamp continually fails to start, as may take place, for example, as a result of a leak in the lamp envelope or activation failure of the lamp electrodes, and this is overcome by the circuit arrangement illustrated in Figure 2. In this arrangement the circuit through the power factor capacitor is broken permanently after several successive failures of the lamp to start. The same references are used in Figure 2 to denote the parts of the circuit which are the same as those which are employed in the circuit shown in Figure 1.

Thus referring to Figure 2 of the drawings the arrangement shown therein again comprises four similar branches each containing a lamp load circuit and associated substitution load circuit, two only of which branches are shown. Each lamp load circuit contains a neon-filled electric discharge lamp 1 directly in series with a choke 2 as in the arrangement shown in Figure 1. The lamp electrode 3 is connected to the supply terminal 4 of an alternator through the operating coil R31 of an electro-magnetic relay R3 which replaces the relay R2 of Figure 1, the choke 2 being connected directly to the fixed contact 8 of the relay R1. The movable contact M1 of the relay R1 is connected to the supply terminal 7 of the alternator, as in the arrangement previously described.

The other fixed contact 9 of the relay R1 is connected directly to one end of the substitution load resistance 12 the other end of which is connected to the supply terminal 4 of the alternator through the operating coil R31 of the relay R3. A power factor correction capacitor C1 is shunted across the choke 2, the lamp 1 and the operating coil R31 of the relay R3, the shunt connection including the contacts 20 of the relay R3 which are open in the unenergised condition of the relay.

One end of the operating coil R11 of the relay R1 is connected through a switch S arranged to be operated intermittently by the control circuit 13, the other end of the coil being connected to one terminal 14 of a three-way spring-operated fuse F the construction of which will subsequently be described. Another terminal 15 of the fuse is connected to the supply terminal 4 and the third terminal 16 is connected to the supply terminal 7 through further contacts 19 of the relay R3, which are closed in the unenergised condition of the relay, a resistor 17 and a thermistor 18, in that order. The contacts 19 of the relay R3 are shunted by a capacitor C2.

In normal operation of the circuit the current through the operating coil R31 of the relay R3 when the lamp 1 or the substitution load 12 is conducting holds the contacts 20 of the relay R3 in series with the power factor correction capacitor C1 closed, and the contacts 19 in series with the thermistor 18 open, the capacitor C2 permitting a small idling current to flow through the thermistor.

However should a lamp fail to start on several successive occasions the recurrent closure of the relay contacts 19 in series with the thermistor 18 when the circuit through the operating coil R31 of the relay R3 is broken, produces a heating effect on the thermistor whose resistance consequently decreases, the current through the thermistor therefore rising until it reaches a value which is sufficient to operate the fuse F.

The first relay R1 therefore remains deenergised with the contact M1 in engagement with the fixed contact 8, the current path through the operating coil R11 of the relay being broken at the fuse. Similarly the relay R3 also remains de-energised since the circuit through the operating coil R31 is broken at the lamp 1, the circuit through the power factor correction capacitor C1 being broken at the relay contacts 20 which remain open. An increase in the current taken from the supply, which would otherwise result if the circuit through the capacitor remained completed is therefore prevented.

The thermistor 18 and its series-connected components are chosen so that the fuse F does not blow after only a few failures of the lamp 1 to start so that with only a temporary lamp failure the relay R1 continues to operate and the circuit through the power factor correction capacitor C1 is opened each time the movable contact M1 of the relay R1 engages the fixed contact 8 since the series circuit through the operating coil R31 of the relay R3 is broken at the lamp. Subsequent operation of the first relay R1 completes the circuit through the operating coil R31 via the substitution load 12 and the relay contacts 20 of the relay R3 close. In this latter condition however, the circuit through the power factor correction capacitor is broken at the relay R1.

After several repeated relay failures the increase in current through the thermistor causes the fuse to blow and the relays R1 and R3 are held in their de-energised conditions as previously described.

By including the capacitor C2 in the circuit across the contacts 19 of the relay R3 it is ensured that a small idling current flows through the thermistor 18 when the contacts are open, and this limits the number of times the relay R3 is operated before the blowing of the fuse. In addition the small idling current reduces the variation in this number of operations which are required at different ambient temperatures.

This can be seen more clearly by reference to Figure 3 in which the approximate current I through the thermistor 18 is plotted against the time $t$ for which the current flows at two different ambient temperatures namely 0° C. and 50° C.; $t$ is, of course, dependent on the number of times the relay contacts 19 are closed.

It can be seen that when the capacitor is omitted the initial current on initially closing the relay contacts is almost zero and the time $t_1$ required for the current to reach a value $i'$ which is sufficient to blow the fuse F when the ambient temperature is 50° C. is considerably less than the time $t_2$ required when the ambient temperature is 0° C. However, with an idling current of $i''$ flowing when the relay contacts are open the time $t_4$ which elapses between the initial closure of the contacts when the ambient temperature is 0° C. is only a little longer than the time $t_3$ which elapses when the ambient temperature is 50° C.

A capacitor is used for limiting the idling current since its impedance is effectively out of phase with that of the thermistor and the combination is therefore less sensitive to temperature variations than would be the case, for example, if the capacitor were replaced by a resistance giving the same total impedance at the supply frequency.

The resistor 17 need only have a small resistance, for example of the order of 10 to 20 ohms, and is included for improving the thermal stability of the thermistor.

The construction of the spring loaded fuse F is shown more clearly in Figure 4, the fuse comprising an insulating base plate 21 on one side of which is attached a metal mounting plate 22 of L-shaped cross-section as shown. To the part 23 of the mounting plate 22 which projects perpendicularly from the base plate 21 there is attached one end of a spring member 24 the other end of which constitutes a contact 25 which is held in normal use of the fuse in engagement with a metal contact plate 26, as shown, by means of a length of fuse wire 27 which is attached to the member 24 and which extends through a hole 29 in the base plate 21, being attached on the other side of the plate to a second spring member 28. Terminals 14, 15, 16 for connecting the fuse into the circuit are provided on the mounting plate 22, the contact plate 26, and the second spring member 28 respectively the terminals being connected, as shown in Figure 2 of the drawings, to the operating coil R11 of the relay R1, the supply terminal 4, and the contacts 19 of the relay R3.

If desired the spring-loaded fuse may be replaced by an alternative form of fuse, for example an explosive fuse, or a current responsive relay, of a suitable construction.

Where the arrangement includes only a single lamp circuit but is otherwise similar to the arrangement illustrated in Figure 2 the three-way fuse may be replaced by the more common type of fuse in a single lead, the operating coil R11 of the relay R1 being connected directly to the contacts 19 of the relay R3 and the fuse F being connected between the conductor from the coil R11 to the contacts 19 and the supply terminal 4 of the alternator 5. This type of fuse may also be used for multiple lamp circuits, although in this case it is necessary to provide separate switches S in series with each relay operating coil R11 in order effectively to isolate the relay coil associated with a blown fuse.

In a modified form of the circuit arrangement shown in Figure 2 the relay R3 may be provided with two operating coils with one coil connected in series with the substitution load 12 and one in series with the lamp 1, and each arranged to operate the relay armature by itself on the passage of current through the substitution load or the lamp respectively.

We claim:

1. An electric lamp-operating circuit arrangement including at least one lamp load circuit, an alternating current supply connected to said arrangement, each said load circuit being of inductive impedance at the frequency of said supply and having associated therewith a power factor correction capacitor connected in shunt with said load circuit, wherein the arrangement includes an electro-magnetic relay having contacts connected in series between the power factor correction capacitor shunting that load circuit and the supply terminals, which contacts are normally open in the unenergised condition of the relay, the relay having an operating coil connected in series with the lamp load circuit so that, in use of the arrangement, the relay is energised to close said contacts when the circuit between the supply terminals in completed through the load circuit but so that when the load circuit is broken and the relay is de-energised the relay contacts are opened to break the circuit through the power factor correction capacitor.

2. An electric circuit arrangement according to claim 1 including switching means for enabling the lamps to be switched on and off in rapid succession and including also, for each lamp load circuit, a substitution load arranged to be switched into circuit by said switching means during the "off" periods of the lamp load, wherein the substitution load is also connected in series with an operating coil of said relay and said relay has an armature, the inertia of which is sufficiently great to ensure that the relay contacts remain closed whilst the switching means is operated to replace the lamp load by the substitution load and vice versa.

3. An electric circuit arrangement according to claim 2 including relay operating means for causing the relay associated with each lamp load circuit to connect the substitution load associated with that lamp load circuit in series with the supply terminals when the relay contacts in series with the corresponding power factor correction capacitor are opened.

4. An electric circuit arrangement according to claim 2 including cut-out means for preventing continued operation of the relay contacts in the event of a lamp failing to strike after several successive operations of the switching means, which cut-out means comprises for each lamp load circuit a thermistor circuit connected between the supply terminals and including, in series with each other, a thermistor, additional contacts of said electro-magnetic relay arranged to be open when the relay is energised, and current responsive means, the current responsive means being arranged to break the thermistor circuit and also interrupt the further operation of the relay should the current through the thermistor reach a predetermined value, and the arrangement being such that this value is attained only after several successive operations of the relay.

5. An electric circuit arrangement according to claim 4 wherein the current responsive means consists of a fuse.

6. An electric circuit arrangement according to claim 5 wherein the switching means comprises a further electromagnetic relay and this latter relay is so arranged that when it is in the unenergised condition the lamp load is connected to the supply, and the fuse is connected in series with the operating coil of said further relay as well as in series with the thermistor, so that the operation of the fuse breaks both the thermistor circuit and the circuit through the operating coil of said further relay.

7. An aerodrome identification beacon including a plurality of lamp load circuits each including at least one electric discharge lamp and connected for operation of the lamp to supply terminals of an alternating current of predetermined frequency supply, each load circuit being of inductive impedance at the frequency of said alternating current supply and having associated therewith a power-factor correction capacitor connected in shunt with the load circuit, the beacon including switching means for switching the lamps on and off in rapid succession and including, for each lamp load circuit, a substitution load arranged to be switched into circuit by said switching means during each "off" period of the lamp load, and an electromagnetic relay having contacts connected in series between the power factor correction capacitor shunting the respective load circuit and the supply terminals, which contacts are normally open in the unenergised condition of the relay, the lamp load circuit and the substitution load circuit each being connected in series with an operating coil of the relay, and the relay having an armature whose inertia is such that the relay contacts remain closed whilst the switching means is operated to replace the lamp load by the substitution load and vice versa but such that the de-energisation of the relay due to an open-circuit failure of the lamp load results in the opening of the relay contacts in series with the power factor correction capacitor.

8. An aerodrome identification beacon according to claim 7, and including also cut-out means comprising for each lamp load circuit, a thermistor circuit connected between the supply terminals and including, in series with each other, a thermistor, additional contacts of said electromagnetic relay arranged to be open when the relay is energised, and current responsive means, the current responsive means being arranged to break the thermistor circuit and also interrupt the further operation of the relay should the current through the thermistor reach a predetermined value, and the arrangement being such that this value is attained only after several successive operations of the relay.

References Cited in the file of this patent

UNITED STATES PATENTS

| | | |
|---|---|---|
| 1,939,332 | Bouwers | Dec. 12, 1933 |
| 2,028,839 | Klinkhamer | Jan. 28, 1936 |
| 2,100,657 | Edwards | Nov. 30, 1937 |
| 2,164,736 | Douden | July 4, 1939 |